United States Patent [19]

Abbondanti

[11] Patent Number: 4,746,850
[45] Date of Patent: May 24, 1988

[54] START-UP SYSTEM FOR A SYNCHRONOUS MOTOR DRIVE

[75] Inventor: Alberto Abbondanti, Plum Boro, Pa.

[73] Assignee: Westinghouse Electric Corp., Pittsburgh, Pa.

[21] Appl. No.: 14,423

[22] Filed: Feb. 12, 1987

[51] Int. Cl.[4] .............................................. H02P 5/40
[52] U.S. Cl. .............................. 318/723; 324/158 MG; 318/778
[58] Field of Search ............... 318/722, 723, 778, 779, 318/702; 324/158 MG

[56] References Cited

U.S. PATENT DOCUMENTS 3,909,688 9/1975 Blaschke et al. ................... 318/702

OTHER PUBLICATIONS

Davoine et al., "Operation of a Self-Controlled Synchronous Motor Without a Shaft Position Sensor", IEEE Trans. on Industry Applications, vol. IA-19, No. 2, Mar./Apr. 1983, pp. 217–223.
Jansch et al., "Measuring and Recording The Load Angle of Synchronous Machines," Journal of Physics: E Scienti Instruments, 1971, vol. 4., G. B., pp. 43–45.

Primary Examiner—David Smith, Jr.
Attorney, Agent, or Firm—C. M. Lorin

[57] ABSTRACT

In a load commutated inverter (LCI) motor drive, the motor is started from a rotor rest position by modulating the rotor winding with a field current at a constant rate to induce stator voltages which are detected in terms of signs, so as to identify the rotor rest position. The induced stator voltages are used to select an initial pair of thyristors of the inverter to be turned on in the firing sequence for the chosen direction of rotation under normal operation of the drive.

6 Claims, 6 Drawing Sheets

START-UP SYSTEM FOR A SYNCHRONOUS MOTOR DRIVE

BACKGROUND OF THE INVENTION

The invention relates to start-up of a synchronous motor drive in general, and more particularly where it involves a load-commutated inverter (LCI) type of motor drive.

In synchronous motor drives using Load Commutated Inverters (LCI), the torque produced at any instant on the rotor of the synchronous motor depends on which pair of inverter thyristors is gated in relation to the instantaneous rotor position. For any rotor position, there is only one pair of thyristors that produces the highest torque value achievable in the required direction for a given DC link current and a given field current. Gating ON any other non-copolar pair will produce a lower torque, or a torque in the direction opposite to the desired sense of rotation of the motor. In order to determine at any the pair of thyristors that should be ON at start-up, the most straightforward approach has been to use a rotor position sensor and to correlate the inverter thyristor gating sequence with the sensed rotor position. This solution was first used in LCI drives and is still used in applications requiring high torque over a wide speed range. The use of a rotary shaft position sensor, however, is by want of a better solution. There are drawbacks associated with a sensor device which include mounting difficulties on large machines, noise sensitivity, susceptibility to stray shaft emf's and a generally poor reliability in a rough environment.

For a number of applications requiring high torque only at high speed, typical of which is flow control, it has been possible to eliminate the inconvenience of a shaft position sensor. One approach is to infer the rotor position from the phase of the stator terminal voltages as induced by the rotating rotor. Such approach works well at medium and high speed however. At low speed, the magnitude of the induced voltages becomes too small to be useful in determining rotor position. Nevertheless, since for flow control applications the torque required at low speed is much reduced, it is possible with a programmed gating sequence synchronized to a modulation of the DC link current impressed on the LCI to fulfill the requirement of accelerating the motor drive, through the low speed range, until a somewhat higher speed when the stator voltages have become effective to indicate the rotor position. This approach makes it difficult to start the motor from a stalled condition. Since there is no position sensor, the rest position of the rotor is unknown and gating of a thyristor pair at random could result in motion in the wrong direction.

The present invention overcomes the latter problem, in that it avoids a shaft position sensor while insuring in a simple and straightforward fashion starting of the motor drive from any stalled motor position.

SUMMARY OF THE INVENTION

In a load commutated inverter (LCI) motor drive, the motor is started from a rotor rest position by modulating the rotor winding with a field current at a constant rate so as to induce stator voltages which are detected in terms of signs to identify the rotor rest position. The induced stator voltages are used to select an initial pair of thyristors of the inverter to be turned on in the firing sequence for the chosen direction of rotation under normal operation of the drive.

DESCRIPTION OF THE INVENTION

Figure 1:
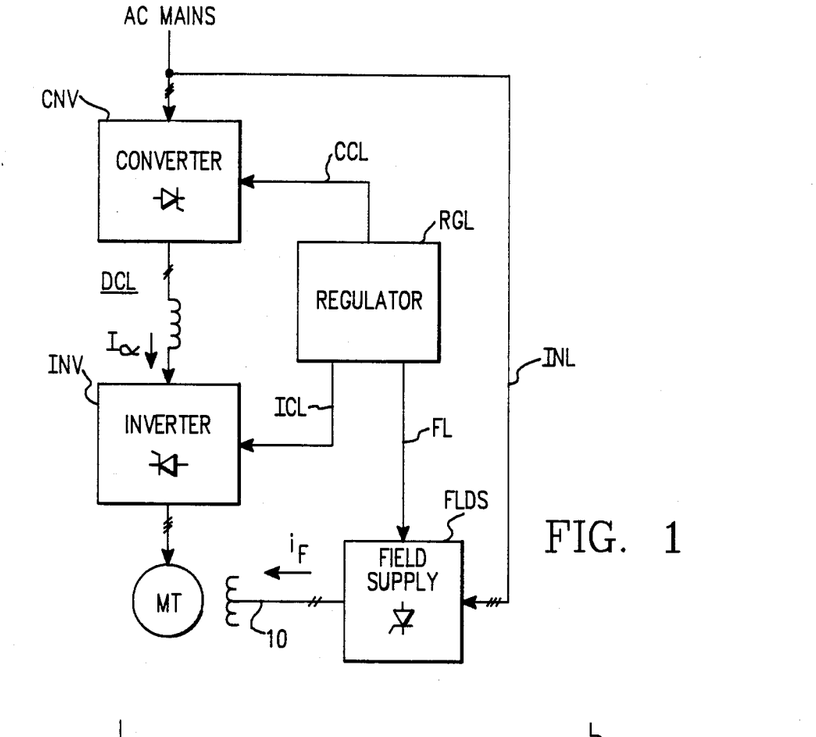
FIG. 1 is a block diagram of an LCI motor drive.

Referring to FIG. 1, a synchronous motor drive is shown in block diagram to include an AC/DC converter CNV connected to the mains of an AC power supply. The converter generates a DC current Id (in this instance, the converter is a current source) on the DC terminals of a DC link DCL. An inverter INV responds to gating signals from control lines ICL for the static switches therein, so as to generate AC power of selected voltage and frequency for a synchronous motor MT. The rotor windings are excited by a field current $i_F$ generated by a field supply circuit FLDC controlled statically by lines FL and supplied by AC inputs derived via lines/NL from the mains of the AC power supply. A regulator RGL provides the control signals for the static switches of the converter by lines CCL (like lines ICL of the inverter INV).

Figure 2:
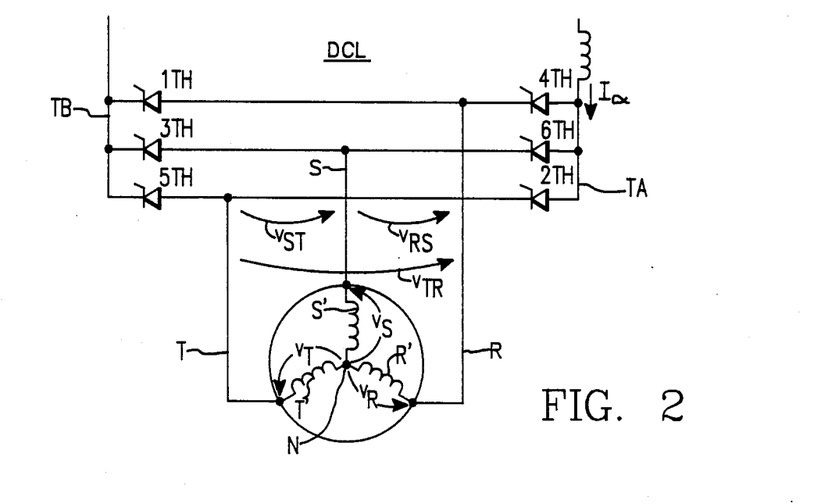
FIG. 2 shows the inverter power circuit coupled to the stator windings of the synchronous motor in the motor drive of FIG. 1.

FIG. 2 shows the inverter INV with its bridge of six thyristors 1TH to 6TH mounted across the DC link terminals (TA, TB) with three phase lines R, S, T, to the motor. The phase windings of the stator are R', S' T' shown illustratively as star-connected about a neutral point N, with voltages $v_R$, $v_S$, $v_T$ across those windings, respectively.

When the motor is stopped and de-energized, in a LCI motor drive without a shaft sensor, the rotor position is generally undetermined. Consequently, in the prior art, there has been no way of specifying which pair of thyristors is to be gated ON first in order to initiate motion in a prescribed direction. The practice has been to, first gate an arbitrary pair in the valid "forward" sequence, thereby sending a pulse of current in two arbitrary stator windings, then, to observe the direction of rotation with a speed sensing device. If the direction is wrong, the pair of thyristors next in the valid gating sequence is energized, a pulse of current being again applied. At worst, with the third attempt no motion in the opposite direction will occur and gating can proceed with the valid sequence at the programmed rate, thus resulting in motor drive start-up. It appears that, with this method a retrograde "jump" will occur, statistically, in 50% of the cases.

Tolerated for flow control applications, such erratic steps may not be considered acceptable by a customer, in fear of mechanical damage to the load. In order to cope with this problem, the thought has been to use some rudimentary (low resolution) shaft position sensing device for starting purpose only. Such a device, however, involves additional costs and it still has the drawbacks mentioned earlier.

This problem is solved, according to the present invention, without the use of a sensor by realizing that it is possible to obtain, prior to starting, enough information regarding the position of the rotor at rest to allow a smooth start in the required direction. This is done without installing any sensing device on the shaft, or elsewhere, but rather by judiciously making use of means, already installed on the motor drive, for stimulating the rotor of the motor at rest, while monitoring the response on the stator.

The gist of the invention resides in acting, prior to the start, upon the field supply means and their regulator so as to cause a modulation of the field current with the motor at rest, it being kept disconnected from its AC power supply by holding all the thyristors of the inverter in the OFF state. A proper interpretation of the stator response will provide information regarding the actual position of the rotor at rest, and from such information the selection is made as to which pair of thyristors in the inverter is to be gated ON, namely the one which is optimal to initiate motion in the allowable direction.

In practice, field modulation is preferably done by ramping the field current up from zero to near rated value, at a predetermined rate, but as high as practical. An improved strategy is also proposed by which ramping up of the field current is performed first, then, ramping down follows at the same rate, or conversely.

Figure 3:
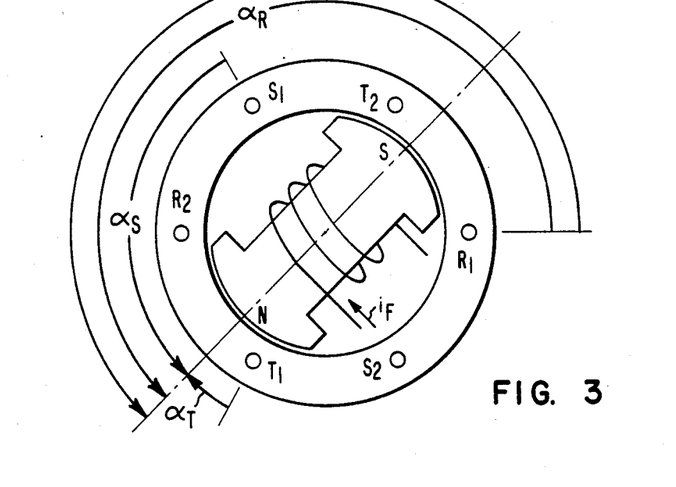
FIG. 3 is a simplified representation of a two-pole synchronous motor.

Referring to FIG. 3, a two-pole machine is shown for the sake of simplicity and for the purpose of explanation. A mid-section of the machine in a plane perpendicular to the shaft is given. The windings are symbolized, each in projection, for a single rectangular turn and distributed around a rotor assumed to be a rotating electromagnet of axis NS, excited by the field current $i_F$. Considering such rectangular turn as having two vertical sides, one entering the horizontal plane of FIG. 3 at $R_1$, the other emerging from such plane at $R_2$, and such two vertical sides of the rectangular turn being connected one to the phase line R, the other to the neutral point N, as shown in FIG. 2, it is further assumed that a varying field current iF flows therein, thereby inducing a voltage $v_R$ in the winding. Therefore, the voltage $v_R$ is given by the equation:

$$v_R = k(di_F/dt) \sin \alpha_R$$

(where $\alpha_R$ is the angle between the vertical plane of the square turn for winding R' and the axis NS of the rotor)

Similar voltages $v_S$ and $v_T$ are induced at the same time in the other windings S' and T' (or rectangular turns, as assumed). If the rate $di_F/dt$ is imposed by the ramp, the stator line-to-neutral voltages induced during a field current ramp-up are step signals of magnitude and sign which provide information regarding angles $\alpha_R$, $\alpha_S$, $\alpha_T$ between the vertical plane of a corresponding winding (R', S', T') and the NS direction of the rotor magnet, respectively.

Figure 4:
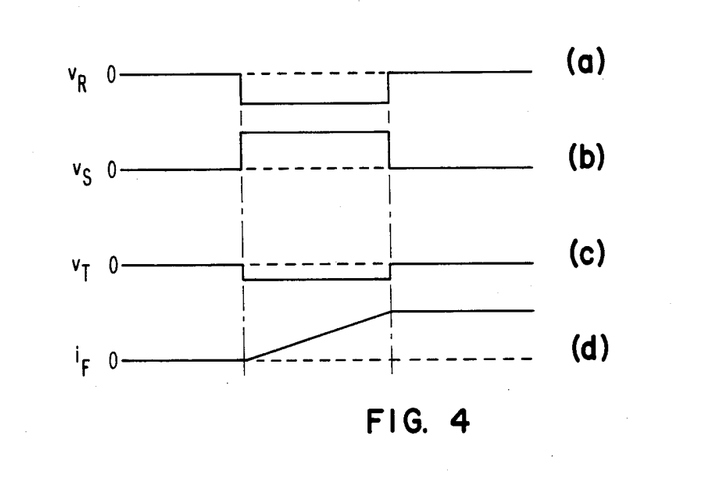
FIG. 4 gives curves correlating the field current ramp applied to the rotor with the induced voltages, in accordance with the invention.

FIG. 4 shows in relation to the ramp-up function of the rotor current $i_F$ the polarity of the winding voltage as well as its magnitude. It appears that, when two voltages have the same polarity, the third one is of the opposite polarity. In the example of FIG. 4, $v_S$ is positive, whereas $v_R$ and $v_T$ are negative.

Figure 5:
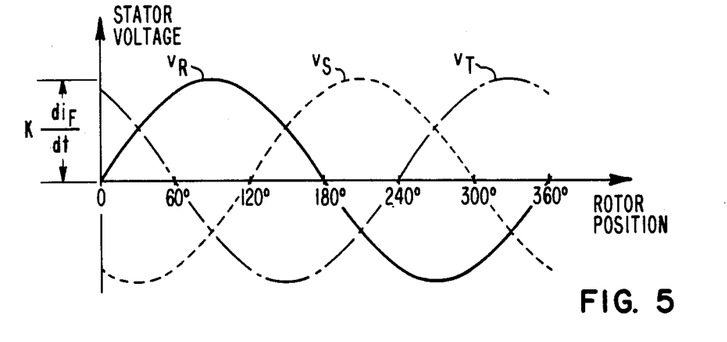
FIG. 5 shows the magnitudes of the step voltages induced by a field current ramp of slope k and correlated for successive orientations of the rotor at rest.

Referring to FIG. 5, the rotor (axis NS) orientation is assumed to vary between 0° and 360° relative to the stator winding (axis R1R2 in FIG. 3) orientation. The values in magnitude and sign of the voltage steps $v_R$, $v_S$, $v_T$ of FIG. 4, can now be related to the rotor positions, assuming that the positive angles are counted counter-clockwise. Accordingly, FIG. 5 shows three sinusoidal curves $v_R$, $v_S$, $v_T$ which are phase shifted by 120°. Each angle on the abscissa represents a rotor position at rest and according to FIG. 4 the magnitudes are correlated for the same ordinate in magnitude and sign, in response to the field current if flowing in the rotor as a ramp of slope k (like in FIG. 4).

Figure 6:
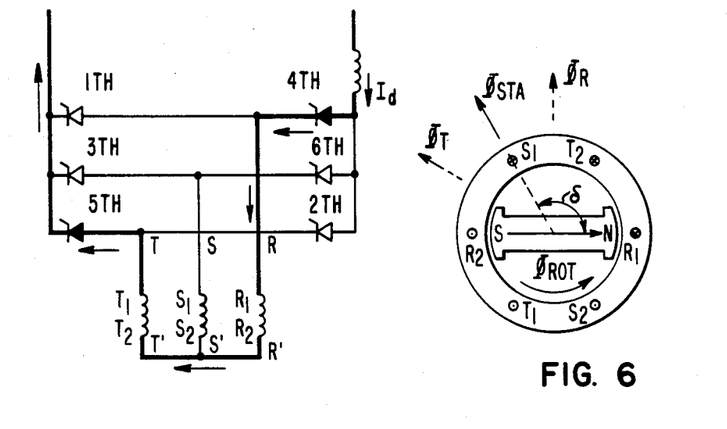
FIG. 6 illustrates an optimal thyristor pair in the ON state as associated with a rotor position at zero degree orientation.

Referring to FIG. 6, the operation of a synchronous motor, namely a brushless DC motor coupled to an inverter having six thyristors 1TH to 6TH, is now considered with the simplified representation of the motor and the rotor orientation when thyristors 4TH and 5TH are ON. The DC link current Id flows into phase R and returns via phase T. If, like in FIG. 3, the field current $i_F$ enters the plane of FIG. 6 at R1 and emerges at $R_2$, in the air gap is created a stator flux component $\phi_T$. The resultant stator flux is $\phi_{STA}$, fixed in space as long as the considered thyristor pair is conducting. This flux will interact with the rotor flux ROT created by the field current. The electromagnetic torque resulting from the interaction is given by:

$$T = k_T \phi_{STA} \phi_{ROT} \sin \delta$$

(where $\delta$ is the angle between $\phi_{STA}$ and the rotor NS axis)

Figure 7:
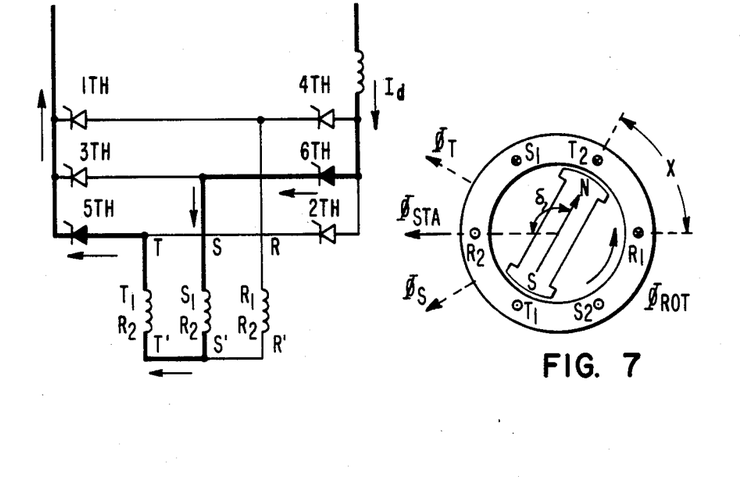
FIG. 7 shows a pair of thyristors succeeding the pair of FIG. 6 in the firing sequence which is associated with a rotor orientation at 60°.

The rotor will be driven counter-clockwise (CCW) by this torque. Assuming the rotor is the position where the angle X of FIG. 3 is zero, (X=0°), the value of angle $\delta$ is 120°. This angle will decrease as a result of the motion of the motor, while the torque first increase reaching a maximum for $\delta = 90°$. Then, it will decrease back to its initial value, when the angle $\delta$ has decreased to 60°. At this moment, in the normal operation of a brushless DC drive, the gating pattern is changed: thyristor 6TH is gated ON and thyristor 4TH is turned OFF, thereby creating the state depicted in FIG. 7. The torque variations just described are repeated and the rotor motion is pursued counter-clockwise (CCW direction). For steady rotation in that direction, a new thyristor should be gated ON at every 60° interval of rotor displacement. The sequence of oncoming thyristors is the same as the numbering order shown in FIG. 2, 6 or 7. Whenever a thyristor is gated ON (e.g. 6TH), the conducting thyristor belonging to the same half bridge (e.g. 4TH) will be turned OFF.

Figure 8:
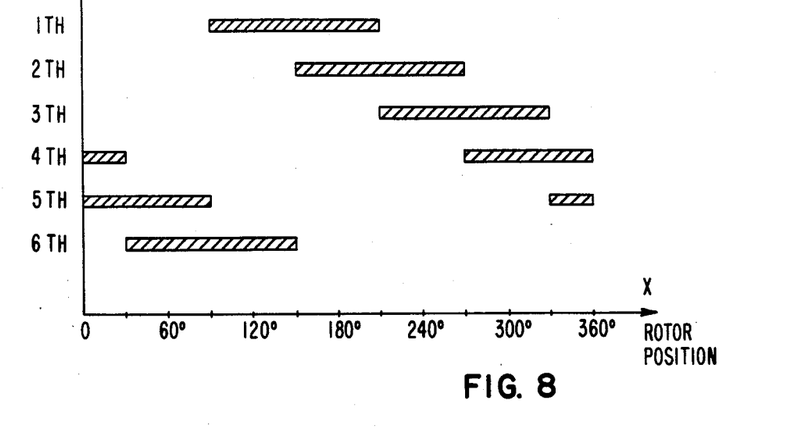
FIG. 8 indicates the ON-states of the pairs of thyristors of the inverter for the successive orientations of the rotor which provide optimal torque and the right direction of rotation, in accordance with the invention.

From the preceding, it appears that, for the rotor position X=0° and for the desired CCW sense of rotation, the gating of 4TH and 5TH (in the example) is the optimal choice. Gating any other pair would result in lower average torque during the subsequent 60° rotor displacement, or in a torque acting in the undesired direction. It is also observed, that gating a copolar pair (i.e. two thyristors of the same pole) would result in a short-circuit across the bridge. Furthermore, it can be shown that the pair (4TH, 5TH) remains the optimal one to be gated ON initially, if the rotor position at rest lies within the range ±30° of axis X=0°, where X is the complementary angle between the NS axis and $\phi_{STA}$. Similarly, for the rotor at rest in the position X=60° (as in FIG. 7), thyristors 5TH and 6TH would be the optimal pair to be gated ON initially. Moreover, this pair will remain the optimal pair for a rotor rest position situated in the range 60°±30°. More generally, FIG. 8 shows the optimal pair of thyristors to be gated ON for any orientation of the rest position. It appears that for any rest position, there is only one pair of thyristors to be gated ON at the instant of starting. Correlating FIG. 5 and FIG. 8 shows the uniqueness of determination for any stator response to a ramp field current. As a matter of fact, because of such correlation between angles $\alpha_R$, $\alpha_S$, $\alpha_T$, (FIG. 3), the three curves of FIG. 5 are interdependent and only two of them are necessary to determine which pair of thyristors is to be initially gated ON as the optimal choice.

In view of the above, a strategy is now proposed, according to the present invention, for determining the optimal initial gating pair by relying upon a careful observation of the response of at least two of the three stator voltages, while the field current is being ramped at a known constant rate. A precise measurement of the amplitudes of the observed responses shall reveal the rotor position, as illustrated in FIG. 5. The rotor position in turn, will indicate the optimal pair in accordance with FIG. 8. When implementing this strategy, there is a need for accuracy both in the measurement of the amplitudes and in the setting and holding of the ramp rate. Errors in either one of these functions would result in a wrong inference of the rotor rest position and, possibly, in gating of the wrong thyristor as the initial one. Therefore, it is proposed to use as an alternate and improved strategy to require the observation of all three stator voltages but relying on polarity detection, rather than amplitude detection. An approach based on polarity detection is attractive since it is tolerant of inaccuracies both in the gains of the voltage sensing circuit and in the scale and linearity of the control means regulating the ramp field current.

Figure 9:
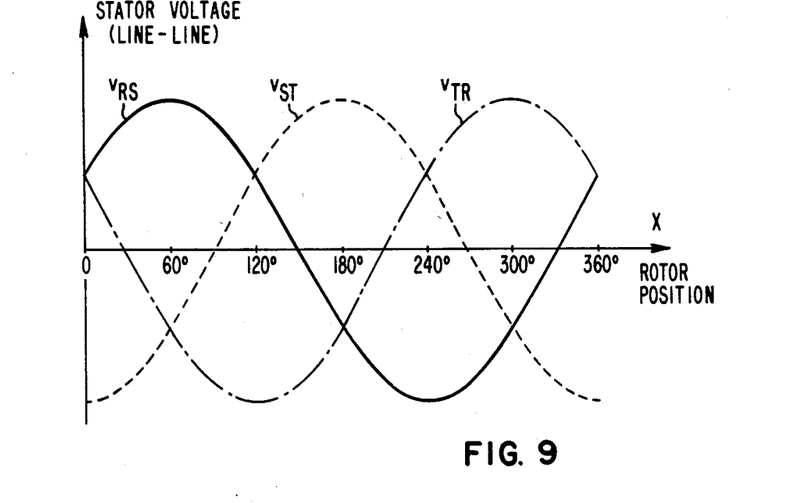
FIG. 9 illustrates with curves the line-to-line stator voltages derived from the stator, according to the invention, for the successive rotor rest positions.

Considering the line-to-line values of the stator voltage responses (rather than the line-to-neutral), these voltages are as follows:

$v_{RS} = v_R - v_S$ $v_{ST} = v_S - v_T$ $v_{TR} = v_T - v_R$ and a plot, similar to FIG. 5, is drawn on FIG. 9 showing the magnitudes and signs of the expected line-to-line stator step voltage responses to a ramp field current, as a function of the rotor position X. From the polarities of the voltages shown in FIG. 9, it appears that the span of rotor positions can be divided in several ranges, each corresponding to a definite combination of polarities valid for the entire range under consideration. Denoting by (+) a positive or a zero value, and by (−) a negative value, TABLE I herebelow lists the different rotor position ranges and the respective combinations of polarities regarding the line-to-line step voltages obtained in response to a ramp iF of slope k:

TABLE I

| Rotor Position Ranges | | | Polarity of Stator Line-to-Line Voltage Step | | |
|---|---|---|---|---|---|
| | | | $v_{RS}$ | $v_{ST}$ | $v_{TR}$ |
| 0 | X | 30 | (+) | (−) | (+) |
| 30 | X | 90 | (+) | (−) | (−) |
| 90 | X | 150 | (+) | (+) | (−) |
| 150 | X | 210 | (−) | (+) | (−) |
| 210 | X | 270 | (−) | (+) | (+) |
| 270 | X | 330 | (−) | (−) | (+) |
| 330 | X | 360 | (+) | (−) | (+) |

Correlating TABLE I and FIG. 8 leads to the following TABLE II establishing the correspondence existing between an observed polarity combination and the optimal pair of thyristors to be gated ON at the beginning of a run in the chosen direction (CCW):

TABLE II

| Observed Stator Polarity Combination | | | |
|---|---|---|---|
| $v_{RS}$ | $v_{ST}$ | $v_{TR}$ | Thyristor Pair to be Gated ON |
| (+) | (−) | (+) | 4TH, 5TH |
| (+) | (−) | (−) | 5TH, 6TH |
| (+) | (+) | (−) | 6TH, 1TH |
| (−) | (+) | (−) | 1TH, 2TH |
| (−) | (+) | (+) | 2TH, 3TH |
| (−) | (−) | (+) | 3TH, 4TH |

A similar table could be prepared for the other direction of running the motor (clockwise, CW).

The method of starting-up a synchronous motor drive in its preferred form is as follows:

Prior to starting the drive, with the inverter bridge still in the OFF state, and with the stator windings de-energized, a field current is applied to the rotor as a ramp up from zero to near its rated value. Rigorous linearity of the ramp is not required, but the slope preferably should be as steep as possible. During ramp-up, the stator line-to-line terminal voltages are measured. In a digitally controlled motor drive, this is best implemented by repeatedly sampling the voltages while adding up the results cumulatively for each phase, an operation amounting to effecting averaging through multiple measurements, thereby increasing the reliability of the process.

Toward the end of the ramp-up period, the polarity of the induced voltages is detected. One of the six combinations of TABLE II is observed. Any other combination than the one shown would indicative of an erroneous measurement. From the observed combination, the desirable pair of thyristors to be gated ON initially is identified by the correlation given by TABLE II. TABLE II can be implemented within the hardware of an analog controller, if the system is analog, or within the software of a microprocessor-based controller, if the implementation is digital.

The field current is then brought to its normal value as customarily required for the start-up of the drive. The run can then proceed with the normal gating sequence and at the programmed rate.

Figure 10:
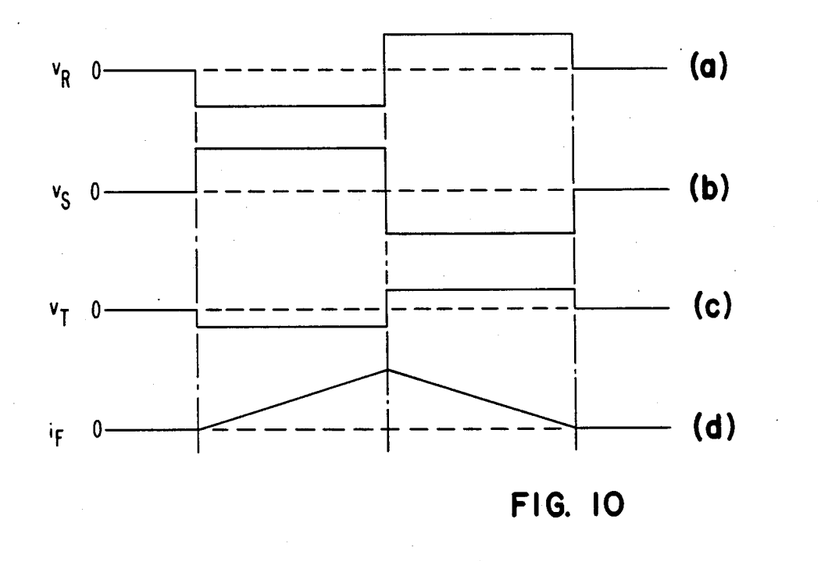
FIG. 10 is like FIG. 4 with a field current is of the same rating but applied successively with two opposite slopes.

A difficulty might arise due to the low rates of the field buildup imposed by large values of field inductance existing in synchronous motors, typically. The consequence is that the stator voltage response will generate only small signals on which errors may be superimposed by the drift and the offsets of poor quality voltage sensing amplifiers. In order to guard against this possibility if errors, the following method, which is easy to implement on digitally controlled systems, is proposed:

Instead of modulating the field current with a single ascending ramp as in FIG. 4, a double ramp is proposed consisting of an interval of field ramp-up from zero to rated value, followed by a ramp-down, descending from rated value to zero at about the same rate. Under such conditions, the signs of the stator voltages are reversed when the ramp slope reverses, as shown by FIG. 10. The stator voltage sensing system accounts for the reversal by taking for each phase the difference between the responses during the two ramp intervals. The final polarity being assessed is carried out on the basis of the difference. In this manner, the size of the useful response is doubled and any spurious response due to the offsets will be cancelled.

Figure 11:
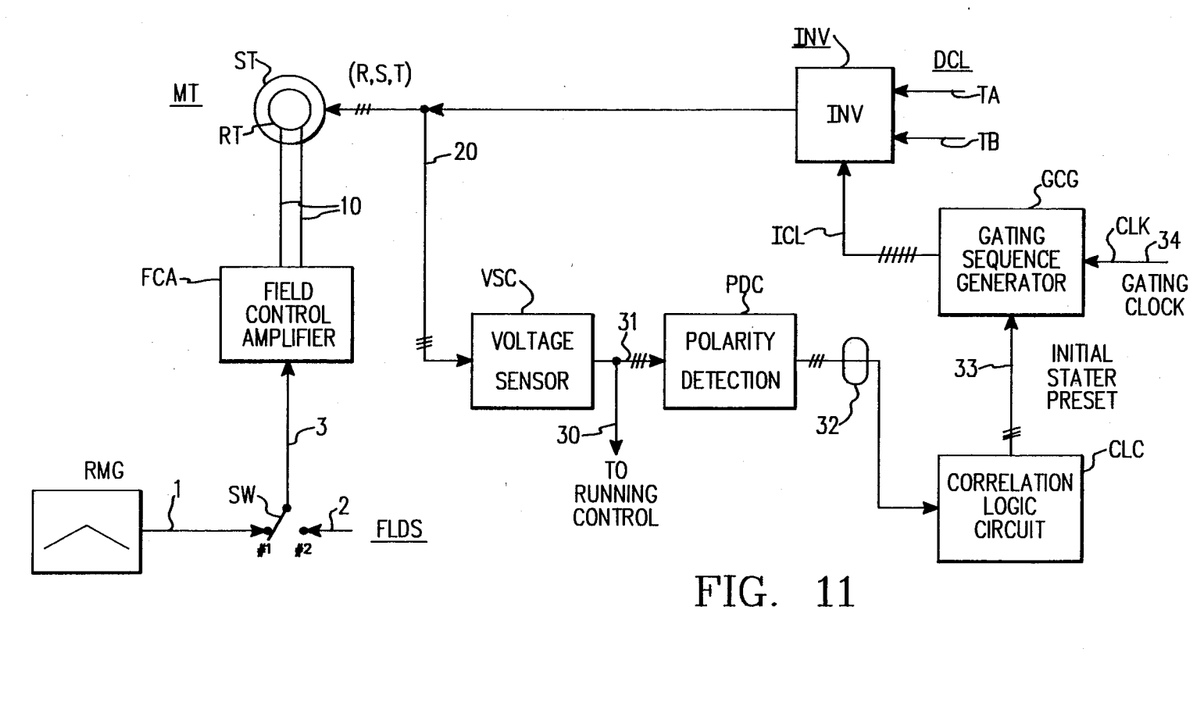
FIG. 11 is a block diagram illustrating the implementation of the start-up system according to the present invention on a LCI motor drive.

Referring to FIG. 11, a block diagram is provided showing an implementation of the start-up method according to the invention. Under normal motor drive operation, a field reference received from lines 2 and 3 is applied to a field control amplifier FCA generating on lines 10 the field current for the rotor winding RT. A switch SW is provided for preventing such normal operation at the time of start-up. Switch in position 2 connects lines 2 and 3. When in position 1, switch SW connects line 3 to line 1 which the output from a ramp generator RMG (illustrated as being for a double ramp like in FIG. 10). Therefore, for this position, the ramp is applied on lines 10 by the field controller FCA with its proper characteristic. Normally, the stator ST receives the phase lines R, S, T, from the inverter INV which is controlled by gating signals on lines ICL applied to the thyristors in the proper firing sequence by a gating sequence generator GSG timed by a clock signal on line 34.

Also, as provided in a conventional motor drive for normal operation are lines 20 which derive from the phase lines the voltage inputs for a voltage sensing circuit VSC applying the feedback information to the controller running the motor drive, by lines 30. Besides the switch SW and the ramp generator RMG which at start-up generate the field current ramp for the rotor, lines 20, voltage sensing circuit VSC and lines 30 and 31 at the output thereof, provide information derived from the stator under the induced voltages at start-up, while the thyristors of the inverter are all turned OFF, so that phase lines R, S, T, are only responding to the voltages induced by the rotor, as earlier explained. The voltages derived from block VSC on lines 31 are inputted into a polarity detection circuit PDC generating on lines 32 a ONE for a positive sign and a ZERO for a negative polarity. It is observed that only three polarity signals need to be combined to form six combinations. Accordingly, there are only three lines 31 and three lines 32. Correlation, as explained with TABLE II, is effected by a look-up table included within a Correlation Logic Circuit CLC responding to the six possible combinations of a word of three digits appearing on line 32 as the address for the look-up table. The output appears on lines 33 also carrying three digits. Such detected information tells the gating sequence generator GSG which pair of thyristors should be first gated ON, when start-ing the sequence as programmed. This is conveniently done by presetting a counter which under the timer and the gating clock signal of line 34 distributes the firing of the thyristor sequentially.

When the start-up has been completed, the inverter proceeds as normal under the DC link DCL (terminals TA and TB) to generate the AC power supply for the stator ST of the synchronous motor MT.

To summarize, the present invention allows the determination of the position of the rotor in a synchronous motor at rest without using a shaft position sensor for a controlled start-up of the motor drive. The main features of the present invention are as follows:

1. The field current is modulated so as to induce in the stator voltages from which the rotor position at rest can be inferred;

2. An ascending field current ramp is used and the magnitudes of at least two induced voltages of the stator are concurrently detected and related to identify the proper pair of thyristors to be first gated ON;

3. Polarity information derived from the line-to-line voltages of the stator is used to identify the optimal pair of thyristors, thereby avoiding sensitivity to amplitude detection errors and to ramp slope inaccuracy;

4. This is achieved by taking advantage of a unique correlation existing between polarity combination as detected and the right, or optimal pair of thyristors to be gated ON initially;

5. A double ramp is used to induce the stator voltages, thereby cancelling any offset errors in the measuring process.

I claim:

1. In a load commutated inverter synchronous motor drive having an inverter including a plurality of thyristors controlled for conduction in a firing sequence related to a direction of motor rotation for providing under normal operation AC power to a synchronous motor having rotor windings and stator windings; the method of starting the motor from a rotor rest position with all the thyristors being initially in the OFF state; comprising the steps of:

applying to the rotor windings a modulated field current to induce phase voltages into the respective said stator windings;

deriving with said induced phase voltages a present combination of polarity signals;

said present combination of polarity signals being correlated to a predetermined firing sequence of thyristors characterizing said rotor rest position;

initiating said firing sequence of the thyristors in accordance with said predetermined firing sequence;

thereby to cause motion of the rotor with a maximal torque in said direction; and applying a normal field current to said rotor winding for normal motor operation thereafter in said direction.

2. The motor drive of claim 1 with said modulated field current having a selected and constant rate and said induced phase voltages having respective constant magnitudes and corresponding polarities as said polarity signals;

said polarity signals being correlated to corresponding rotor rest positions and corresponding firing sequences;

said predetermined firing sequence being selected in accordance with the correlated present polarity signals;

thereby to match the corresponding rest position of the motor.

3. The motor drive of claim 2 with said field current being applied successively with said constant rate for two opposite rate polarities.

4. In a load commutated inverter synchronous motor drive having an inverter including a plurality of thyristors controlled for conduction in a predetermined firing sequence for providing AC power to a synchronous motor having stator windings and rotor windings; a start-up system operative with said thyristors in the OFF state and with the rotor in a rest position; comprising:

means for applying to said rotor a field current for inducing voltages in the stator;

means responsive to said stator voltages for deriving a signal combination characteristic of said stator windings in relation to said rotor rest position;

means for storing as a reference a series of ON-state thyristor combinations each representative of an individual in said predetermined firing sequence, each of said steps being correlated with a predetermined combination of said induced stator voltages in relation with the applied said field current;

means for comparing said derived stator signal combination with said stored ON-state thyristor combinations for selecting a matching one of said ON-state combinations; and means for initially firing said thyristors in sequence from said matching combination;

with said field current applying means generating a field current of constant rate;

with said stator signal combination being a combination of polarity signs.

5. The start-up system of claim 4 with each of said series of ON-state thyristors combinations being identified in relation to a combination of signs characterizing such signal combination.

6. The start-up system of claim 5 with said field current applying means generating a field current of successively opposite rates and of same amplitude.

* * * * *